United States Patent [19]
LaVelle et al.

[11] Patent Number: 5,617,774
[45] Date of Patent: Apr. 8, 1997

[54] SELF-STIRRING COOKING DEVICE

[75] Inventors: Jeffrey LaVelle, Edmonds; Paul Shemeta, Seattle, both of Wash.

[73] Assignee: J.L. Manufacturing Inc., Everett, Wash.

[21] Appl. No.: 539,229

[22] Filed: Oct. 4, 1995

[51] Int. Cl.⁶ .............................. A47J 27/00; B01F 7/20
[52] U.S. Cl. .................... 99/348; 366/282; 366/251; 366/312
[58] Field of Search .......................... 99/348; 366/279, 366/287, 282, 283, 284, 285, 286, 247, 251, 252, 254, 312

[56] References Cited

U.S. PATENT DOCUMENTS

| | | | |
|---|---|---|---|
| 110,916 | 1/1871 | Houcke . | |
| 2,707,622 | 5/1955 | Vance | 99/348 |
| 3,011,768 | 12/1961 | Clark . | |
| 3,357,685 | 12/1967 | Stephens . | |
| 3,697,053 | 10/1972 | Will | 99/348 |
| 3,783,770 | 1/1974 | Aries | 99/348 |
| 3,810,605 | 5/1974 | Lambert | 99/348 |
| 3,960,369 | 6/1976 | Sommer | 99/348 |
| 4,151,792 | 5/1979 | Nearhood | 99/348 |
| 4,339,992 | 7/1982 | Kurland | 99/348 |
| 4,395,133 | 7/1983 | Clevenholm et al. | 99/348 |
| 4,511,255 | 4/1985 | Saucier | 366/138 |
| 4,576,089 | 3/1986 | Chauvin | 99/332 |
| 4,832,501 | 5/1989 | McCauley | 99/348 |
| 4,854,718 | 8/1989 | Wang | 366/252 |
| 4,856,910 | 8/1989 | Cuschera | 99/348 |
| 5,013,158 | 5/1991 | Tarlow | 366/251 |
| 5,201,263 | 4/1993 | Teng | 99/335 |
| 5,332,310 | 7/1994 | Wells | 99/348 |

*Primary Examiner*—David Scherbel
*Assistant Examiner*—Reginald L. Alexander
*Attorney, Agent, or Firm*—Christensen O'Connor Johnson & Kindness PLLC

[57] ABSTRACT

A motorized self-stirring cooking device for a container (8) that includes a handle (16) attached to the outside of the container (8) is provided. The self-stirring cooking device comprises: a back-tapered projection (36) on the bottom inner surface (14) of the container; a vertical shaft (46) with a blade (52) attached normally thereto, a tab (54) of the blade (52) in rotational communication with the projection (36); a motor assembly (62) for rotating the vertical shaft (46) and blade (52); connection mechanism for positioning the motor assembly (62) from the rim (10) of the container (8) over the opening of the container (8) in a cantilevered fashion; and a power cord (90) for supplying electricity. The motor assembly (62) further includes a low voltage motor (68), a gearbox (70), a pair of orthogonal bevel gears (72), (74), a current limiting electronic unit (80), and a speed control knob (82).

20 Claims, 5 Drawing Sheets

SELF-STIRRING COOKING DEVICE

FIELD OF THE INVENTION

The present invention relates to cooking devices and, more particularly, to a motorized self-stirring cooking device for stirring food within a container.

BACKGROUND OF THE INVENTION

Various types of motorized and manual self-stirring devices currently exist for use in the cooking of food that must be constantly stirred to avoid scorching or burning, e.g., sauces, gravies, dips, fondues, soups, puddings, etc. Most of these devices have some disadvantage which prohibits them from efficiently accomplishing their intended purpose.

For example, recipes typically require food to be transferred to and from a cooking container during the heating process. In order to transfer food using common utensils (e.g., a measuring cup, a ladle, tongs, etc.), without splattering food on a work surface or on the cook, it is important that the utensil easily fit within the opening of the container. Optimally, both the utensil and a portion of a user's hand should fit within the container opening to allow a controlled transfer of the food.

Current self-stirring cooking devices include stirring hardware mounted in a lid or on a legged bridge that extends over the container opening, between two or more portions of the container's rim. This arrangement is inconvenient when trying to transfer food, because a bridge, or lid, of the stirring device covers large portions of the container opening, thus reducing the available space within which to fit a utensil and/or hand. Quite often, the user must stop the stirring device, remove the stirring hardware from the container opening, transfer the ingredients, reposition the stirring hardware, and finally restart the stirring device. U.S. Pat. No. 3,357,685; U.S. Pat. No. 5,201,263; U.S. Pat. No. 4,832,501; U.S. Pat. No. 3,810,605; and U.S. Pat. No. 4,339,992 are examples of stirring devices having this disadvantage.

A second disadvantage seen in current self-stirring devices is poor positioning of the stirring blade. The food next to the bottom inner surface of the container is closest to the heating source and should be frequently moved to prevent the food from burning and sticking to the container. In order to move the bottom layer of food, it is very important to position the stirring blade close to the bottom inner surface of a food container. Many current stirring devices have blades positioned relatively far above the bottom inner surface of the container. This causes a layer of food to remain unstirred on the bottom of the container. Eventually, the food will overheat and burn, giving the remaining food a burned taste. Even a relatively small layer of unstirred food can produce enough burned material to destroy the taste of a dish. Examples of stirring devices having this disadvantage are described in U.S. Pat. No. 3,697,053 and U.S. Pat. No. 4,339,992.

Poor blade positioning also occurs when the vertical shaft of a stirring device and/or blades mounted on the lower end of the vertical shaft are bent or distorted. In this regard, the lower end of the blades of most stirring devices are unsupported. In watery foods, the reactive force applied to a blade mounted on a vertical shaft whose lower end is unsupported during mixing is usually inadequate to bend or distort the shaft or the blade. In contrast, the reactive force applied to a blade mounted on a vertical shaft whose lower end is unsupported when mixing rigid ingredients such as unmelted cheese or butter, can bend and distort the shaft and/or the blade. This often occurs when blades become stalled when trying to push a clump of food forward. A bent vertical shaft is undesirable because it may cause the shaft or the blade to scrape or scratch the inner surface of a container. Poorly mixed food may also result, as well as damage to the motor assembly if the vertical shaft stalls for an extended period of time. U.S. Pat. No. 4,832,501, U.S. Pat. No. 3,810,605, and U.S. Pat. No. 3,697,053 are examples of stirring devices having this disadvantage.

U.S. Pat. No. 4,854,718 discloses a manual mixer that has a cone-shaped projection on the bottom inner surface of a container about which the vertical shaft and blade is rotated. The projection helps to keep the vertical shaft from moving laterally away from its optimum position, and thus acts as a lateral support for the blade and vertical shaft. The projection, however, does not prohibit the vertical shaft from moving vertically upward during spinning. Upward movement of the vertical shaft of a stirring device results in a corresponding upward movement of blades attached to the vertical shaft, resulting in the formation of an unstirred food layer to undesirably remain on the bottom inner surface of the container. Therefore, for stirring devices used in heating food, the projection of the U.S. Pat. No. 4,854,718 does not adequately solve the problem of poor blade and/or vertical shaft positioning.

As mentioned above, poor blade positioning may also result in stalling the vertical shaft and blade. Such a stalled state is damaging to most motor assemblies, and which, if not relieved, will eventually cause the motor to fail. U.S. Pat. No. 5,013,158 discloses a self-stirring cooking device that includes an overload sensor that audibly signals to the user when the motor is being overloaded, but does nothing to protect the motor components during overload. This is a disadvantage for those cooks who may not be within audible distance of the device for a period of time.

Thus, a need exists for a new and improved self-stirring cooking device that allows the user to easily add or remove ingredients from the container using common household utensils, without having to interrupt the self-stirring device. The ideal self-stirring cooking device should have a blade that is kept at a very close distance to the bottom of the container during all types of stirring. As a part of basic design principles, the ideal device should protect its motor assembly from damage should a vertical shaft or a blade become stalled. The ideal device should also protect the user from electrical shock in the event the devices becomes immersed into conductive foods. Lastly, as with any household appliance, the entire device should be easy to assemble and disassemble, easy to clean, and easy to store.

SUMMARY OF THE INVENTION

In accordance with the present invention, a self-stirring cooking device having a motor assembly supported from the side of a cooking container is provided. The container, preferably a pot, includes an outwardly extending handle. The self-stirring cooking device includes a projection affixed to the bottom inner surface of the container; a vertical shaft in rotational communication with the projection, the vertical shaft including a blade attached generally normally thereto; a motor assembly for rotating the vertical shaft and blade, the vertical shaft being in rotational communication with the projection; connection mechanism for mounting the motor assembly upon the handle; and a power cord for supplying electricity.

In accordance with further aspects of this invention, the connection mechanism includes a molded plastic bracket attached to the lower surface of the motor assembly and a hand grip attached to the upper surface of the handle. The bracket has an elongated boss, a longitudinal and horizontal portion formed at the upper surface of the elongated boss for supporting the motor assembly, and a flat hook located on the bracket near a bracket end farthest from the container. The hand grip includes a channel for receiving the elongated boss and a ridge for receiving the flat hook.

In accordance with yet other aspects of the invention, the motor assembly extends in a substantially horizontal plane from the handle, or from the side of the container, over the opening of the container. The arrangement allows a large, continuous area in the container opening for easily adding or removing ingredients.

In accordance with other aspects of this invention, the projection on the bottom inner surface of the container includes a thin shelf extending slightly above the bottom inner surface of the container and a back-tapered tip projecting beyond the shelf.

In accordance with still further aspects of this invention, the blade is preferably oriented relative to the bottom inner surface of the container, at an angle of roughly 10 to 60 degrees from vertical. Rotation of the blade is in a direction such that the upper edge of the blade trails the lower edge of the blade.

In accordance with still other aspects of this invention, the motor assembly includes a housing within which is positioned a motor, a gearbox, a pair of bevel gears, an electronic unit, and a power jack. The motor assembly further includes a speed adjustment knob. One of the bevel gears includes a socket for receiving an end of the vertical shaft. The electronic unit includes electronic elements for limiting the voltage and current available to the motor so as to protect the motor from damage should the vertical shaft and blade become stalled.

As will be readily appreciated from the foregoing summary, the invention provides a self-stirring cooking device of superior design that includes a motor assembly positioned over a container opening in a way that allows a user to more easily add and remove contents from the container while the contents are cooking without having to disturb the motor assembly. The present invention also improves on previous designs by providing a blade and vertical shaft arrangement that maintains the blade in close proximity to the bottom inner surface of the container. This prevents a significant layer of food from scorching, as well as keeps the blade and vertical shaft from distorting or getting stuck on food chunks. In addition, the cooking device of the present invention is capable of preventing the motor from damage should the blade or vertical shaft become stalled. The device operates on low voltage/current and may be used safely around liquids and upon stove tops. Lastly, the present invention is easy to assemble and disassemble, easy to clean, and easy to store.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Although the present invention was developed for, and is described in connection with the cooking arts, it is to be understood that the invention may also find use in other mixing applications.

Figure 1:
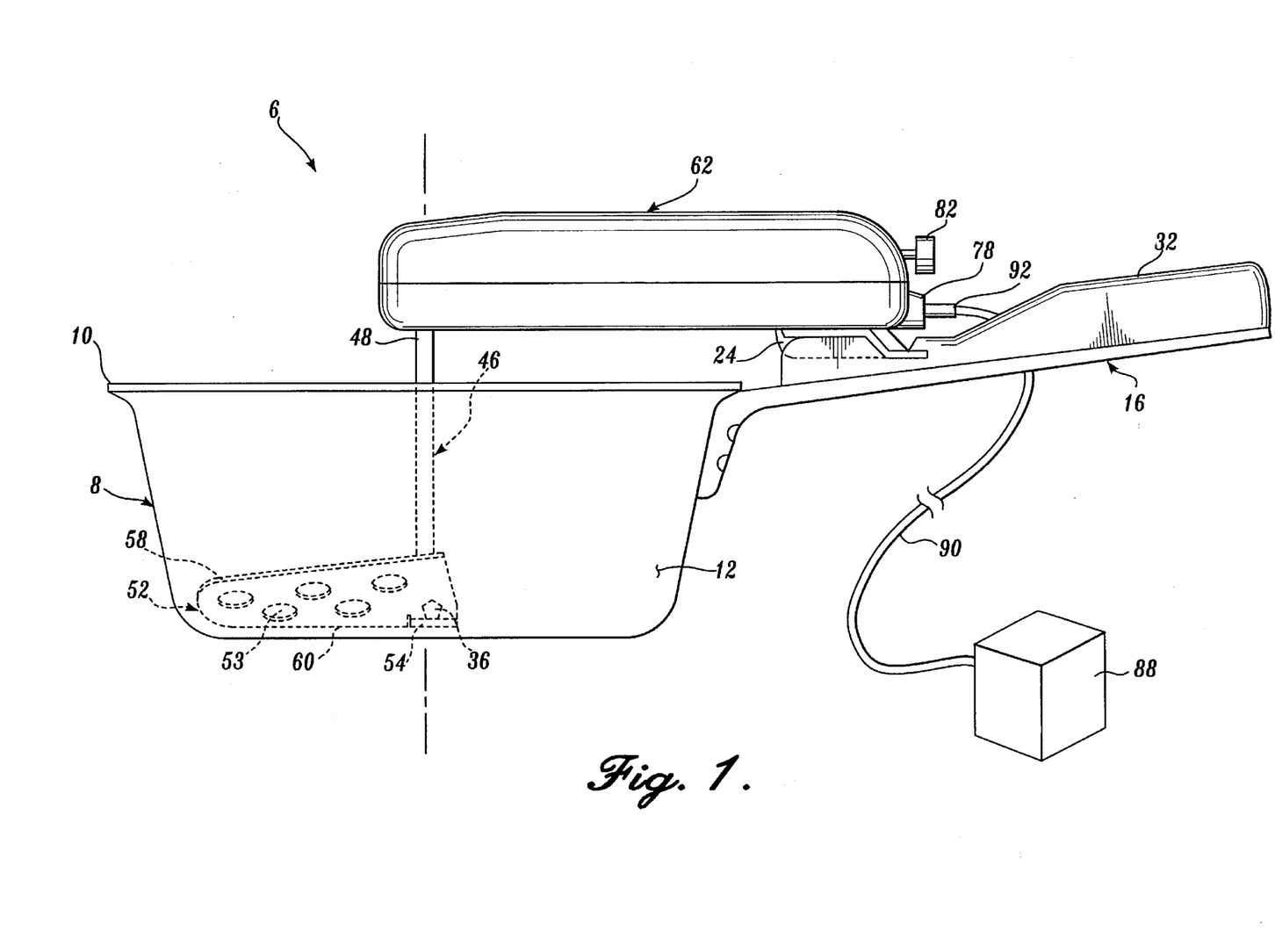
FIG. 1 is a side elevational view of a self-stirring cooking device formed in accordance with the present invention, with portions shown in phantom.

FIG. 1 is a side elevational view of a self-stirring cooking device 6 formed in accordance with the present invention, showing a portion located inside of a container 8 in phantom. An outwardly extending handle 16 is attached to the outside of the container 8. The self-stirring cooking device 6 includes a projection 36 affixed to the bottom inner surface 14 (shown in FIG. 4) of the container 8; a vertical shaft 46 linked to the projection 36, the vertical shaft including a blade 52 attached thereto; a motor assembly 62 for rotating the vertical shaft 46 and the blade 52; connection mechanism (a bracket 24 shown in FIG. 1) for mounting the motor assembly 62 to the handle 16; and a power cord 90 for supplying DC power to the motor assembly 62.

In detail, the container 8 is formed of a material suitable for heating and has a rim 10 around its opening. The elongate handle 16 has a substantially horizontal orientation and is attached to the container's outer surface 12 near the rim 10. The preferred attachment method is by riveting the handle 16 to the container 8. The handle 16 may be of the same material as the container 8 or a different material. The handle 16 may also be of a heat resistant material or include a heat protective surface, in order to avoid burning the user's hand.

Figure 2:
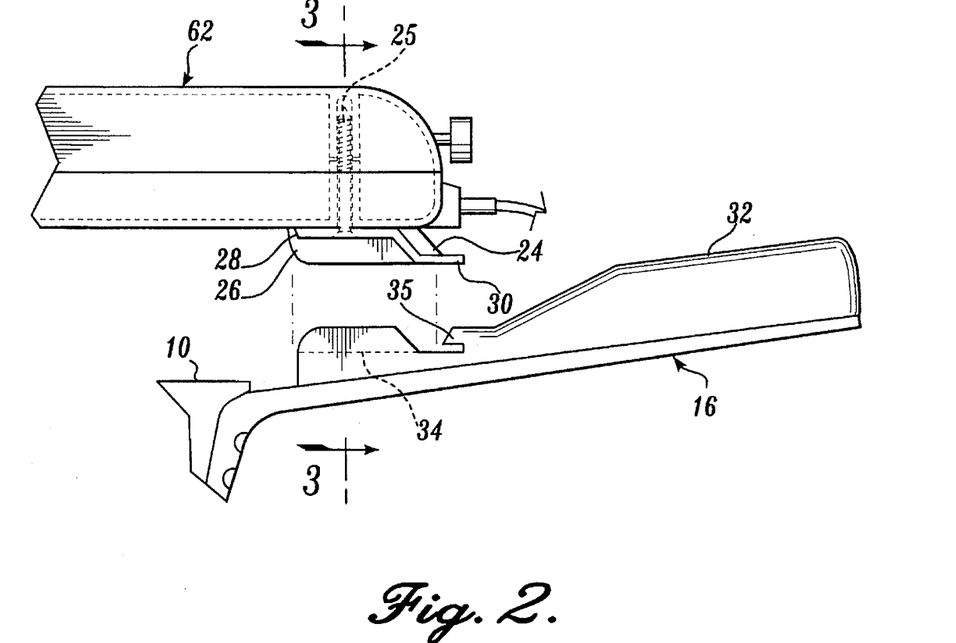
FIG. 2 is a side view of a connection means formed in accordance with the present invention.
Figure 3:
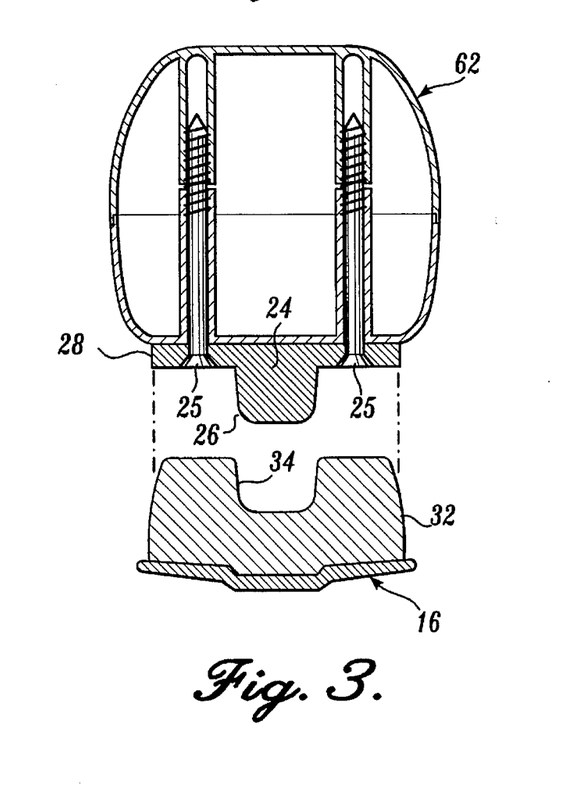
FIG. 3 is a cross-sectional view of the connection means of FIG. 2.
Figure 6:
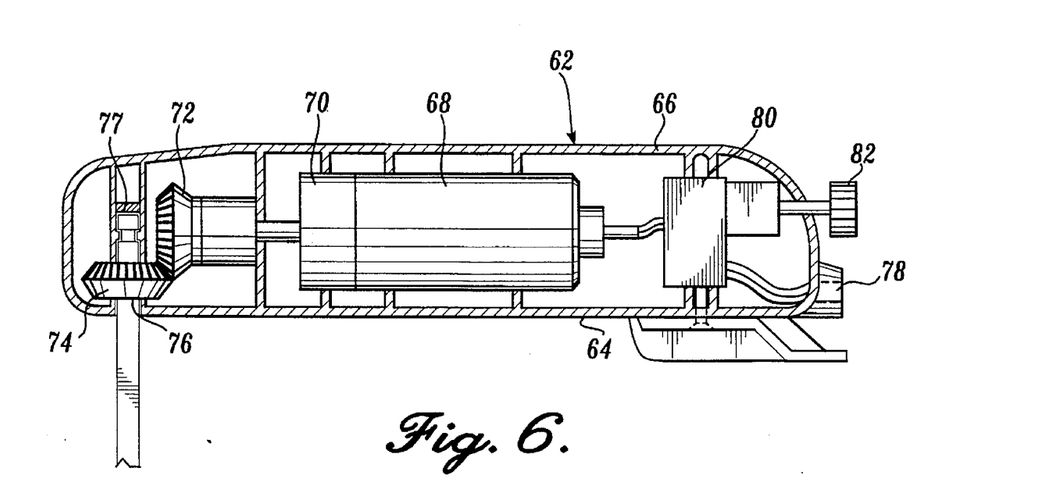
FIG. 6 is a cross-sectional view of the motor assembly of the self-stirring cooking device shown in FIG. 1.

FIG. 2 shows a connection mechanism including a bracket 24 and a hand grip 32. The bracket 24 has an elongated boss 26, a longitudinal and horizontal portion 28, and a flat hook 30. The bracket 26 is preferably a conventionally molded plastic piece. The bracket 26 extends vertically downward from the lower surface of one end of the motor assembly 62 and is attached to the motor assembly using one of a number of known methods. Screws 25 are shown in FIGS. 2, 3, and 6. The bracket may alternatively be integrally formed with the motor assembly housing.

The elongated boss 26 extends along the bracket, in a vertical plane. The longitudinal and horizontal portion 28 is formed at the upper region of the bracket, above the elongated boss 26, and functions to support the motor assembly 62 and to offer a convenient region within which the screws 25 may be mounted. The flat hook 30 is located on the bracket 24 near an end of the bracket farthest from the container.

The hand grip 32 is attached to the upper surface of the handle 16 using conventional methods and is preferably formed of thermoset plastic. Other materials may be used, e.g., wood, metal, etc. Likewise, the hand grip 32 may be integrally formed with the handle 16 if appropriate for a particular application. The hand grip 32 includes a channel 34 for receiving the elongated boss 26 and a ridge 35 for receiving the flat hook 30. The ridge 35 is located farther from the container than is the channel 34. In operation, the bracket 24 is mounted on the handle 16 by inserting the flat hook 30 under the ridge 35 and pushing the boss into the channel. In this manner, the motor assembly 62 is caused to extend from the handle 16 over the opening of the container 8, in a substantially horizontal plane.

There are a number of connection mechanisms that can be used in lieu of that described above. What is important for optimum operation is that whatever method is selected it should be easy to assemble, disassemble, and clean, and should offer resistance to rotational movement in all directions. The elongated boss described above offers resistance to roll and yaw movements of the bracket, while the flat hook resists pitch movements and additionally snaps the bracket into place. These features help secure the motor assembly to the handle during use, even when the blade 52 is stirring thick, stiff foods.

It is also important to the present invention that the selected connection mechanism positions the motor assembly over the opening of the container 8 such that a large, continuous area is available in the container opening for easily adding or removing ingredients. Therefore, connection mechanisms mounted to the side of the container or the handle are preferred. In the above described connection mechanism, the weight of the motor assembly is distributed between both the bracket and the vertical shaft. It is encompassed in the present invention to use a connection mechanism attached to one side of the container that is capable of supporting the entire weight of the motor assembly.

Figure 4:
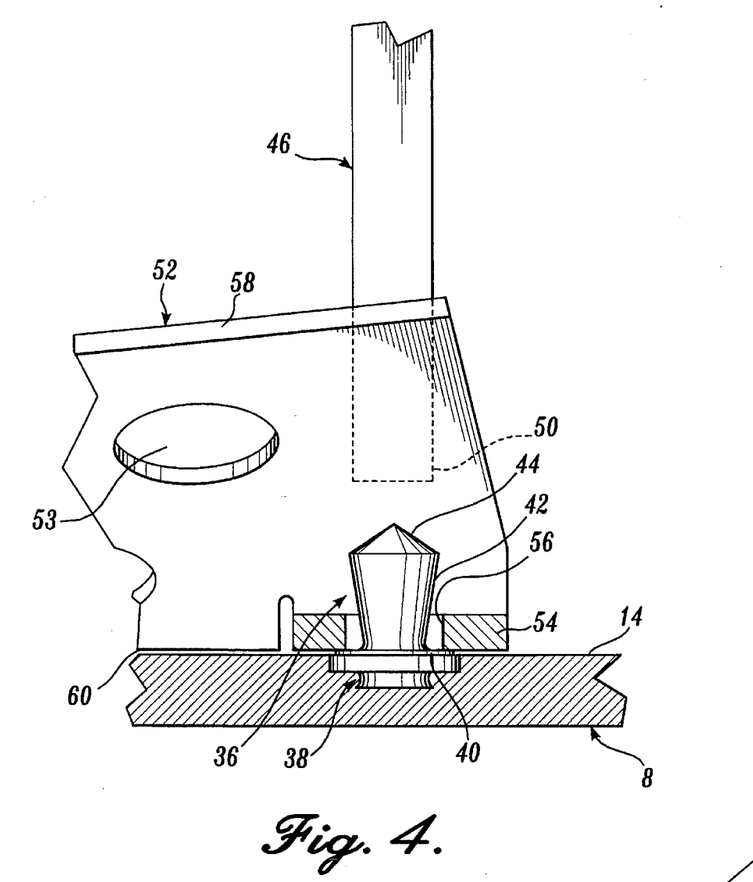
FIG. 4 is an enlarged cross-sectional view of a portion of the self-stirring cooking device shown in FIG. 1.

The projection 36 is affixed to the bottom inner surface 14 of the container 8, as shown in FIG. 4. The projection 36 optimally includes three portions: an anchor 38; a shelf 40; and a back-tapered tip 42. Preferably, these three portions are integral, i.e., formed from a single piece of material (e.g., stainless steel). Alternately, they may be formed separately and attached together (e.g., by welding, gluing, screwing, etc.)

The use of a separate projection, rather than one integrally formed in the container, improves ease of manufacture since the container 8 can be formed separately, a hole drilled in the bottom inner surface 14 of the container 8, and the anchor 38 mounted in the hole. In this regard, the anchor 38 includes one or more circular disks, shaped to firmly fit into the hole in the container 8. The upper surface of the anchor 38 is preferably flush with the bottom inner surface 14 of the container 8.

The shelf 40 lies above the anchor 38 and is generally a thin flat circular piece, horizontally oriented and positioned to lie a small amount above the bottom inner surface 14 of the container 8. The height of the shelf 40 is very important, because once assembled, the vertical shaft 46 and blade 52 rest upon the shelf 40. Thus, the shelf height determines the thickness of the layer of food at the bottom of the container that is not stirred. The shelf height is optimally from 0+ to 0.030 inches for a container 8 having an inner diameter of approximately 6 inches. The height of the shelf 40 will vary depending on the size of the container 8, the materials used for the blade and vertical shaft, the intended application, and a designer's manufacturing capability. In general, a designer should position the blade 52 as close to the inner bottom surface 14 of the container 8 as possible, without allowing the vertical shaft 46 and/or blade 52 to scrape the surface 14. Of course, for some applications, the blade 52 may purposefully be positioned to scrape the bottom inner surface 14 (such as when using a rubber blade to stir melting chocolate), or purposefully be positioned to reside some distance from the surface 14 (such as when using a spoon-shaped blade to stir broth). For these cases, the appropriate blade should be used, the shelf height remaining unchanged so that blades designed to achieve other objectives can be used.

The back-tapered tip 42 is similar to a vertically oriented cylinder, except the tip's sides are back-tapered because the tip's lower diameter is slightly smaller than its upper diameter, and instead of a flat face at the upper end (as would be the case with a cylinder), a rounded apex 44 extends upwardly a small distance. The apex 44 makes it easier to insert the vertical shaft 46 onto the projection 36. The tip 42 lies above the shelf 40. Further, the diameter of the lower end of the projection is smaller than the diameter of the shelf 40.

Figure 5:
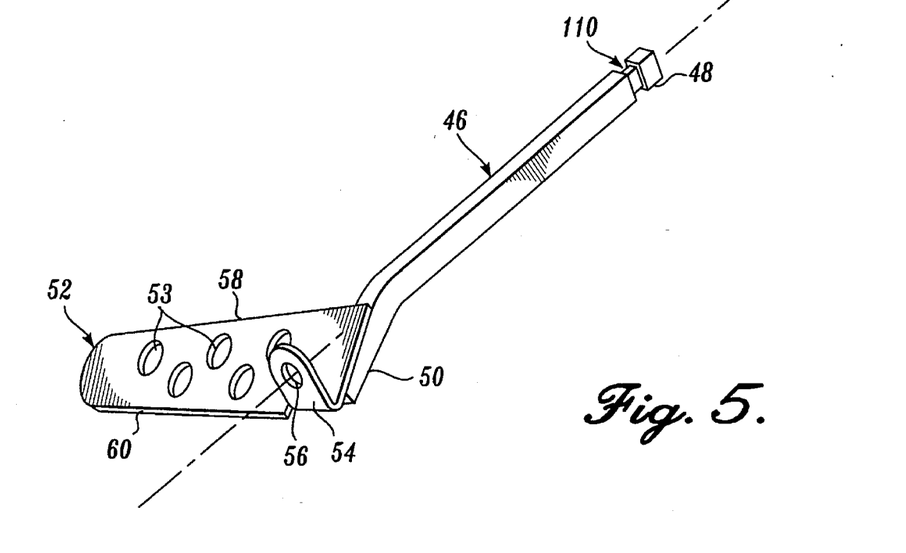
FIG. 5 is a perspective view of a vertical shaft and blade of the self-stirring cooking device shown in FIG. 1.

FIG. 5 is a perspective view of the vertical shaft 46 and blade 52. The shaft 46 includes an upper end 48 (shown in FIG. 1 ) having a non-circular (e.g., square or rectangular) cross-section. The upper end 48 of the shaft includes a detent 110 to allow the upper end 48 to be easily held in the motor assembly 62. In operation, the vertical shaft is snapped into the motor assembly. After use, the shaft may be either pulled out or a release mechanism (not shown) may be provided to release the shaft.

The lower end 50 of the vertical shaft 46 is permanently attached to the blade 52, such as by gluing, welding, riveting, etc. The blade 52 has a small tab 54 extending from a lower edge 60 of the blade that lies in a plane parallel to the bottom inner surface 14 of the container 8. The tab 54 includes a circular hole 56 through which the projection 36 tip is inserted. The diameter of the tab hole 56 is slightly greater than the upper diameter of the projection 36 tip, so that the tab 54 just fits over the tip 42. The center of the tab hole 56 is in-line with the longitudinal axis of the vertical shaft 46.

In operation, the resistance of the food being stirred in the container pushes the blade and the vertical shaft sideways until the sides of the tab hole 56 contact the side of the protrusion 36. As the vertical shaft rotates, the tab slides around the stationary projection. The projection pushes back on the tab with a force that includes a downward component (due to the projection's backtaper) that urges the tab, and hence the blade, downward to the shelf. This results in keeping the blade close to the shelf.

In a second embodiment (not shown) of the connection of the vertical shaft to the bottom inner surface of the container, the tab hole 56 and projection 36 are generally reversed in placement. Therefore, the bottom inner surface 14 of the container 10 includes a backtapered bore, whereby the diameter of the bore is smaller at the bottom inner surface 14 and becomes larger as the bore extends downward, partially through the bottom of the container. The vertical shaft includes a protrusion that extends vertically downward at the lower end of the vertical shaft, or on the bottom of the blade, directly below the rotational axis of the vertical shaft. The protrusion also has a slight backtaper in that its end nearest the vertical shaft is of a smaller diameter than its end furthest from the vertical shaft. In this second, reverse protrusion embodiment, the protrusion is inserted into the bore and the backtaper of the rotated protrusion works against the stationary bore of the container to urge the vertical shaft downward.

The blade 52 is preferably positioned at a tilt from vertical. The optimal angle has been found to be roughly between 10 to 60 degrees. The tilt of the blade 52 is in a direction such that an upper edge 58 of the blade trails the lower edge 60 of the blade. This causes the blade 52 to act as a kind of wedge to urge itself and the vertical shaft 46 downward, thereby counteracting the shaft's tendency to move up the projection during rotation. The tilt of the blade 52 also helps to push ingredients up from the bottom of the container. The blade includes holes 53 to prevent large, stagnant formations of food from sticking to the back of the blade 52.

Other arrangements of blade and vertical shafts are possible. There are many variations on: the number of blades attached to the vertical shaft; each blade's size and shape; methods of blade attachment to the vertical shaft; methods of attachment of the vertical shaft to the motor assembly; vertical shaft and blade materials; etc. Regardless of configuration, the blade 52 should be in close proximity to the bottom inner surface 14 of the container 8 during rotation by either tilting the blade 52 in a way that urges the blade downward, or by providing a back-tapered projection 36 tip, or, preferably, both. These methods are considered the most advantageous because they are unaffected by variations in tolerances between the other components of the device. Using a connection means that allows a portion of the motor assembly weight to bear down on the vertical shaft also helps to urge the vertical shaft and blade downward.

Without using one of these methods, the position of the upper end of the vertical shaft would need to be carefully maintained in order to hold the blade close to the bottom surface of the container. This would require that tight tolerances be met for each of the components supporting the upper end of the vertical shaft (i.e., the handle connection to the container, the connection mechanism attachment to the handle, the motor assembly connection to the connection mechanism, etc.) While this is possible, it is expensive to build. It is also difficult to maintain, considering the typical kitchen environment where food can be easily lodged between the bracket and the motor. This would cause the motor assembly to extend crookedly from the bracket, further causing the vertical shaft to be tilted and the blade to scrape the bottom of the container.

FIG. 6 is a cross-sectional view of the motor assembly 62 of a self-stirring cooking device formed in accordance with the present invention. The size of the motor assembly is such that it extends from the connection mechanism to the center of the container 8. The motor assembly 62 includes a tubular nylon housing 66 within which a DC motor 68, preferably a 24 volt DC motor, is mounted. Affixed to one end of the motor is a molded plastic planetary gearbox 70 which drives a pair of bevel gears 72, 74 arranged orthogonal to one another. The lower bevel gear 74 includes a socket 76 for receiving the detented upper end 48 of the vertical shaft 46 (shown in FIG. 1). The socket 76 is shaped to match the non-circular shape of the upper end of the vertical shaft 46. The detented relation between the socket and upper end 48 causes the vertical shaft to be securely held by the motor assembly. The preferred socket 76 additionally includes a horizontal abutment 77 that is placed within the socket 76 and that serves to limit vertical movement of the shaft 46 up the socket. The abutment 77 may also serve to transfer a portion of the weight of the motor assembly to the container via the vertical shalt 46, further constraining the vertical motion of the shaft and urging the shaft and blade toward the inner surface of the container.

In operation, the motor assembly 62 is held by the connection means such that the socket 76 lies directly above the projection 36 on the bottom inner surface 14 of the container 8. When power is applied to the motor 68, the shaft of the motor rotates the gears in the gearbox 70, causing the bevel gears 72, 74, to rotate. Rotation of the bevel gears causes the vertical shaft 46 and blade 52 to rotate.

Figure 7:
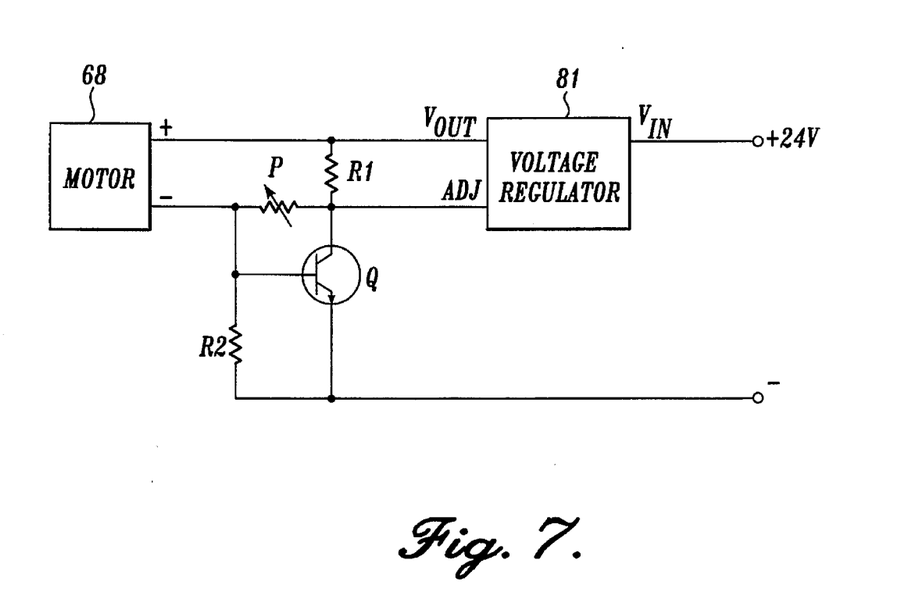
FIG. 7 is a schematic diagram of the electronic unit of the self-stirring cooking device shown in FIG. 1.

An electrical jack 78 is located in the housing 66 of the motor assembly 62 near where the housing overlies the handle 16 of the container 8. The jack 78 is designed to receive an input plug 92 located at the end of the power cord 90 (shown in FIG. 1). The jack 78 is connected to an electronic unit 80 that regulates the current and voltage applied to the DC motor 68. A schematic diagram of the electronic unit 80 is shown in FIG. 7. The speed of the motor 68 depends on the applied voltage and the torque developed by the motor 68 is a function of the current drawn by the motor. The electronic unit 80 is designed to keep the speed of the motor constant regardless of the applied load by adjusting the current. The electronic unit also limits the amount of current available to a preferred maximum, such as 0.6A. The DC motor 68 used in one actual embodiment of the invention is capable of receiving a maximum of 0.69 A while stalled without sustaining damage.

The electronic unit 80 shown in FIG. 7 includes: a voltage regulator 81; two resistors designated R1 and R2; a potentiometer designated P; and a current-limiting transistor designated Q. The positive DC voltage input, received from the hereinafter described power supply, is applied to the input, $V_{IN}$, of the voltage regulator 81. The positive output of the voltage regulator, $V_{OUT}$, is applied to the positive input of the motor 68 and to one end of R1. The other end of R1 is connected to one end of P, the collector of Q, and the current control input ADJ of the voltage regulator 81. The other end of P is connected to the negative terminal of the motor 68, the base of Q and one end of R2. The other end of R2 and the emitter of Q are connected to the negative DC voltage input.

In operation, the adjustment of P controls the voltage applied to the motor 68 and, thus, the speed of the motor. R2 senses the current passing through the motor. High motor current causes the voltage at the collector of Q to drop, thereby causing the voltage regulator to limit current flow to the motor.

As will be appreciated by those skilled in the art, FIG. 7 is representative of a voltage-controlling/current-limiting system that uses a transistor switch to limit current. Obviously, other circuits capable of controlling motor voltage and limiting motor current can be used if desired, provided the circuit prevents the motor from being damaged if the blade or vertical shaft is stalled.

By limiting motor current, the electronic unit also functions to limit the input current received from the power cord 90, which is designed to provide low current 24 volt power. The power cord receives power from a wall unit 88 designed to be inserted into a wall receptacle (as shown in FIG. 1). The unit includes a stepdown transformer, a rectifier, and a filter that converts 110 volt AC power into 24 volt DC power. Preferably, the wall unit 88 includes a fuse that prevents excessive current from entering the motor assembly, making it impossible for potentially large or dangerous currents to leave the power supply and enter the motor assembly.

In contrast to other kitchen appliances, the low voltage/low current arrangement of the invention makes it virtually impossible to be shocked from the device, even if the motor becomes fully immersed in a conductive liquid. Most current appliances operate on 110 volt AC power and rely on ground fault interrupt circuits to prevent accidental shock. Ground fault interrupt circuits have been known to fail.

The motor assembly and/or electronic unit of the present invention may further include typical features known in the art, e.g., an intermittent rotational component, a timer, etc.

Also attached to the motor assembly 62 is a control knob 82 (shown in FIG. 1) for manually regulating the maximum rotational speed of the stirring device. The control knob 82 operates the potentiometer P, and is shown schematically in FIGS. 1 and 6, and diagrammatically in FIG. 7. The preferred rotational speed of the device ranges between 0 and 100 revolutions per minute.

Figure 8:
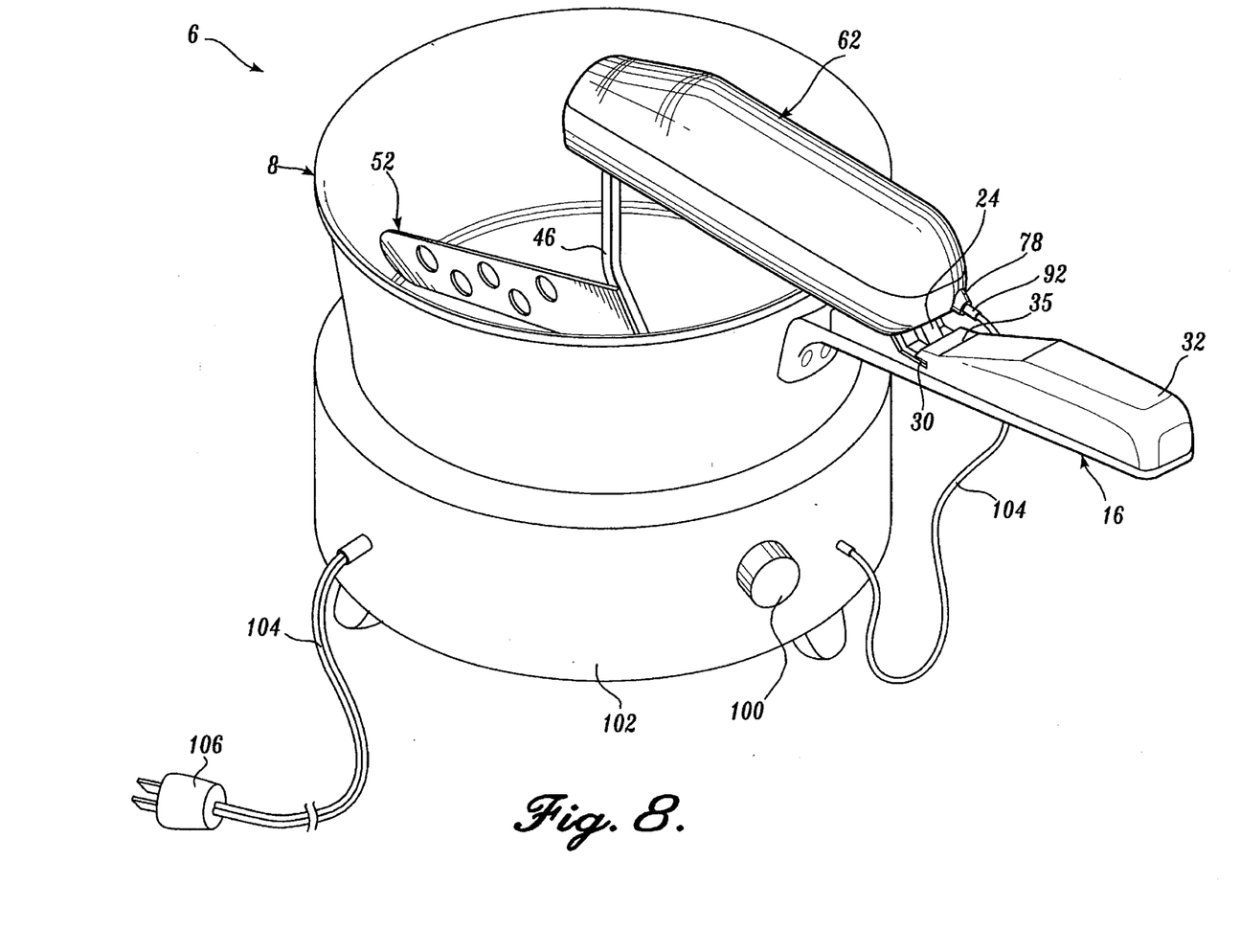
FIG. 8 is a perspective view of a second embodiment of a self-stirring cooking device formed in accordance with the present invention.

FIG. 8 is a perspective view of a second embodiment of a self-stirring cooking device formed according to the present invention. The second embodiment includes a heating plate 102 upon which the container 8 having the self-stirring cooking device 6 may be placed. The heating plate 102 is of a type generally known to those skilled in the art with the modification of an output power connection 104 for providing the low voltage and low current power input to the self-stirring cooking device 6.

The preferred heating plate includes a temperature control knob 100, and components capable of drawing power from a wall receptacle, such as a simple plug 106 and cord 104, as shown in FIG. 8. Contained within the heating plate 102 is a voltage converter similar to that provided in wall plug 88 for stepping the line voltage on cord 104 to the preferred 24 DC volts for use in the circuit of FIG. 7. The precise design of the heating plate 102 will vary according to the requirements of a particular application and will depend upon factors generally known to those skilled in the art (e.g., desired plate temperature, material selection, etc.)

In operation, the upper end 48 of the vertical shaft 46 is fitted into the socket 76 of the lower bevel gear 74. The distal end of the motor assembly 62 is secured to the container by the connection mechanism while the blade tab 54 is fitted over the container projection 36. The plug 106 or wall unit 88 is connected to a wall receptacle. Then, the input plug 92 is inserted into the electrical jack 78, causing power to be supplied to the motor 68 via the electronic unit 80. As a result, the motor 68 rotates the vertical shaft 46 and blade 52. The rotating blade 52 stirs the contents of the container 8. The speed control knob 82 is adjusted to set the desired rotational speed.

While the preferred embodiment of the invention has been illustrated and described, it will be appreciated that various changes can be made therein without departing from the spirit and scope of the invention. For example, while the illustrated and described self-stirring cooking device has been described as including a bevel gear arrangement, it is to be understood that these items may easily be replaced by other gear arrangements known in the art of mechanical design. Further, in some applications, it may be desirable to substitute other known paddle shapes and orientations, such as those described in the aforementioned patents for the described paddle. Likewise, the present invention may be implemented in various sizes and formed of various materials, depending on the intended application. It is to be understood that within the scope of the appended claims the present invention encompasses these variations and others readily understood to those skilled in the art.

The embodiments of the invention in which an exclusive property or privilege is claimed are defined as follows:

1. An automatic self-stirring cooking device for stirring the contents of a container having an opening and a handle, the device comprising:

(a) connection mechanism;

(b) a motor assembly connected to the container via the connection mechanism, the motor assembly extending from a side of the container over a portion of the opening of the container, the motor assembly capable of producing rotational motion;

(c) a vertical shaft having an upper end, the shaft having at least one blade attached axially therefrom for stirring the contents of the container, the upper end of the vertical shaft in rotational communication with the motor assembly; and (d) wherein the connection mechanism includes a bracket rigidly attached to the motor assembly and a hand grip rigidly attached to the handle, the bracket further including an elongated boss and a flat hook, the hand grip further including an elongated channel and a ridge, the channel and ridge for receiving the boss and hook, respectively.

2. An automatic self-stirring cooking device according to claim 1, wherein the motor assembly includes a socket for receiving the upper end of the vertical shaft, the socket including an abutment for transferring a portion of the weight of the motor assembly to the vertical shaft.

3. An automatic self-stirring cooking device according to claim 1, wherein the container further includes a bottom inner surface, the cooking device further including a projection extending from the bottom inner surface of the container, one of the vertical shaft and the at least one blade being rotatably connected to the projection; wherein one of the vertical shaft and the at least one blade includes a tab having a hole therein, the tab being capable of being placed onto the projection.

4. An automatic self-stirring cooking device according to claim 3, wherein the projection is back-tapered to encourage the vertical shaft downward during its rotations.

5. A self-stirring cooking device for stirring the contents of a container having a rimmed opening, and a bottom inner surface, the device comprising:

(a) a motor assembly;

(b) connection mechanism for attaching the motor assembly to the container, the motor assembly extending from one side of the container over a portion of the opening of the container, the motor assembly capable of producing rotational motion;

(c) a vertical shaft having an upper end, the vertical shaft having at least one blade attached axially therefrom for stirring the contents of the container, the upper end of the vertical shaft being in rotational communication with the motor assembly; and (d) a projection extending from the bottom inner surface of the container, one of the vertical shaft and the at least one blade being rotatably connected to the projection; wherein one of the vertical shaft and the at least one blade includes a tab having a hole therein, the tab being capable of being placed onto the projection.

6. An automatic self-stirring cooking device according to claim 5, further comprising a handle attached to the container, wherein the connection mechanism is a bracket removably attached to the handle.

7. An automatic self-stirring cooking device according to claim 5, the container further having an inner bottom surface, the cooking device further including a back-tapered projection extending upwardly from the bottom inner surface of the container, one of the vertical shaft and the at least one blade being rotatably attached to the projection.

8. An automatic self-stirring cooking device according to claim 5, wherein the at least one blade is angled from a vertical plane, the at least one blade including an upper edge and a lower edge, the direction of rotation of the at least one blade during use being such that the upper edge trails the lower edge.

9. An automatic self-stirring cooking device according to claim 5, wherein the motor assembly includes a low-voltage motor and a current-limiting electronic unit.

10. A self-stirring cooking device for stirring the contents of a container having a rimmed opening and a handle, and a bottom inner surface, the device comprising:

(a) a motor assembly;
  (b) connection mechanism for attaching the motor assembly to the container, the motor assembly extending from one side of the container over a portion of the opening of the container, the motor assembly capable of producing rotational motion;
  (c) a vertical shaft having an upper end, the vertical shaft having at least one blade attached axially therefrom for stirring the contents of the container, the upper end of the vertical shaft being in rotational communication with the motor assembly; and
  (d) a projection extending from the bottom inner surface of the container, one of the vertical shalt and the at least one blade being rotatably connected to the projection; wherein the connection mechanism includes a bracket being removably attached to the handle of the container.

11. An automatic self-stirring cooking device according to claim 10, wherein the motor assembly includes a socket for receiving the upper end of the vertical shaft, the socket including an abutment for transferring a portion of the weight of the motor assembly to the vertical shaft.

12. An automatic self-stirring cooking device according to claim 10, wherein the motor assembly includes a low-voltage motor and a current-limiting electronic unit.

13. An automatic self-stirring cooking device according to claim 10, wherein the at least one blade is angled from a vertical plane by an amount falling roughly in the range of from 10 degrees to 60 degrees, the at least one blade including an upper edge and a lower edge, the direction of rotation of the at least one blade during use being such that the upper edge trails the lower edge.

14. An automatic self-stirring cooking device according to claim 10, further including a heating plate upon which the container may be located, the heating plate capable of heating the container, the heating plate including an output power connection for providing low voltage, low current power to the motor assembly.

15. A self-stirring cooking device comprising:

(a) a container having an opening;
  (b) a motor assembly;
  (c) connection mechanism for attaching the motor assembly to the container, the motor assembly extending over a portion of the container opening, the motor assembly capable of producing rotational motion;
  (d) a vertical shaft having an upper end, the vertical shaft having at least one blade attached axially therefrom for stirring the contents of the container, the upper end of the vertical shaft being in rotational communication with the motor assembly; and
  (e) a back-tapered projection extending from the bottom inner surface of the container, one of the vertical shaft and the at least one blade being rotatably connected to the projection.

16. A self-stirring cooking device according to claim 15, further including a heating plate upon which the container may be located, the heating plate capable of heating the container, the heating plate including an output power connection for providing low voltage, low current power to the motor assembly.

17. A self-stirring cooking device according to claim 15, wherein the motor assembly includes a low-voltage motor and a current-limiting electronic unit.

18. An automatic self-stirring cooking device according to claim 15, wherein the motor assembly includes a socket for receiving the upper end of the vertical shaft, the socket including an abutment for transferring a portion of the weight of the motor assembly to the vertical shaft.

19. An automatic self-stirring cooking device according to claim 15, wherein the container includes a handle attached to the container and the connection mechanism is a bracket removably attached to the handle.

20. In a self-stirring cooking device including a rotatable vertical shaft and at least one blade for stirring, the improvement comprising a back-tapered projection extending from the bottom inner surface of the container, one of the vertical shaft and the at least one blade being rotatably connected to the projection.

\* \* \* \* \*

UNITED STATES PATENT AND TRADEMARK OFFICE
CERTIFICATE OF CORRECTION

PATENT NO. : 5,617,774
DATED : April 8, 1997
INVENTOR(S) : J. LaVelle et al.

It is certified that error appears in the above-indentified patent and that said Letters Patent is hereby corrected as shown below:

| COLUMN | LINE | |
|---|---|---|
| 11 | 24 | "shalt" should read --shaft-- |
| (Claim 10, | line 16) | |

Signed and Sealed this

Twenty-fourth Day of June, 1997

Attest:

BRUCE LEHMAN

*Attesting Officer*   *Commissioner of Patents and Trademarks*